(12) United States Patent
Aoki et al.

(10) Patent No.: US 8,717,761 B2
(45) Date of Patent: May 6, 2014

(54) HIGH-VOLTAGE APPARATUS AND VEHICLE

(75) Inventors: Kengo Aoki, Wako (JP); Kanae Ohkuma, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 236 days.

(21) Appl. No.: 13/350,298

(22) Filed: Jan. 13, 2012

(65) Prior Publication Data
US 2012/0181827 A1    Jul. 19, 2012

(30) Foreign Application Priority Data
Jan. 14, 2011    (JP) .................................. 2011-006402

(51) Int. Cl.
*H05K 7/20*    (2006.01)
*B60N 2/44*    (2006.01)

(52) U.S. Cl.
USPC ........ 361/692; 361/679.5; 361/641; 361/643; 361/694; 361/695; 165/80.3; 165/122; 165/126; 165/104.33; 180/68.1; 180/68.5

(58) Field of Classification Search
USPC .......................... 361/600, 641, 643, 676, 679, 361/679.46–679.5, 690–695; 180/68.1, 180/68.2, 68.3, 68.5, 65.2, 65.3, 65.1, 311, 180/312, 313; 429/61, 99, 100, 101, 120, 429/148, 151, 156, 159, 163; 320/104, 112, 320/138, 150, 153; 62/259.2; 454/184; 174/50, 520; 165/80.3, 104.33, 165/121–126, 185
See application file for complete search history.

(56) References Cited

U.S. PATENT DOCUMENTS

| 6,094,927 | A  | * | 8/2000  | Anazawa et al. ................ 62/239 |
| 6,220,383 | B1 | * | 4/2001  | Muraki et al. ................ 180/68.5 |
| 6,344,728 | B1 | * | 2/2002  | Kouzu et al. .................. 320/116 |
| 6,457,542 | B1 | * | 10/2002 | Hosono et al. ............... 180/68.1 |
| 6,798,658 | B2 | * | 9/2004  | Takedomi et al. ............. 361/694 |
| 6,931,878 | B2 | * | 8/2005  | Kubota et al. ................ 62/259.2 |
| 7,051,825 | B2 | * | 5/2006  | Masui et al. ................. 180/68.5 |
| 7,079,379 | B2 |   | 7/2006  | Yamaguchi et al. |
| 7,500,512 | B2 | * | 3/2009  | Hasegawa et al. ............. 165/41 |
| 7,654,351 | B2 | * | 2/2010  | Koike et al. ................. 180/68.5 |

(Continued)

FOREIGN PATENT DOCUMENTS

| JP | 2005-178732 | 7/2005 |
| JP | 2006-082803 | 3/2006 |

OTHER PUBLICATIONS

Japanese Office Action for corresponding JP Application No. 2011-006402, Feb. 1, 2013.

*Primary Examiner* — Michail V Datskovskiy
(74) *Attorney, Agent, or Firm* — Ditthavong Mori & Steiner, P.C.

(57) ABSTRACT

A high-voltage apparatus includes a battery device, a high-voltage control device, a housing, and a cooling structure. The cooling structure includes a first cooling channel to cool the battery device, a second cooling channel to cool the high-voltage control device, a connection channel connecting the first cooling channel to the second cooling channel, and a ventilator. The connection channel has a first opening portion connected to the first cooling channel, a second opening portion connected to the second cooling channel, and an inner flow path to communicate the first opening portion to the second opening portion. A sectional area of the first opening portion and a sectional area of the second opening portion are each set to be smaller than a sectional area of the inner flow path.

9 Claims, 6 Drawing Sheets

(56) References Cited

U.S. PATENT DOCUMENTS

| | | | |
|---|---|---|---|
| 7,767,354 B2* | 8/2010 | Saito et al. | 429/433 |
| 7,771,865 B2* | 8/2010 | Takasaki et al. | 429/83 |
| 7,819,172 B2* | 10/2010 | Otsuka et al. | 165/80.3 |
| 7,905,307 B2* | 3/2011 | Kubota et al. | 180/68.1 |
| 7,924,562 B2* | 4/2011 | Soma et al. | 361/694 |
| 7,947,387 B2* | 5/2011 | Saito et al. | 429/62 |
| 7,997,966 B2* | 8/2011 | Yoda | 454/339 |
| 2003/0067747 A1* | 4/2003 | Hasegawa et al. | 361/695 |
| 2005/0111167 A1* | 5/2005 | Yamaguchi et al. | 361/676 |
| 2007/0000231 A1* | 1/2007 | Otsuka et al. | 60/203.1 |
| 2007/0175623 A1* | 8/2007 | Park et al. | 165/202 |
| 2008/0196957 A1* | 8/2008 | Koike et al. | 180/68.5 |
| 2008/0251246 A1* | 10/2008 | Ohkuma et al. | 165/287 |
| 2012/0073797 A1* | 3/2012 | Park et al. | 165/201 |

* cited by examiner

HIGH-VOLTAGE APPARATUS AND VEHICLE

CROSS-REFERENCE TO RELATED APPLICATIONS

The present application claims priority under 35 U.S.C. §119 to Japanese Patent Application No. 2011-006402, filed Jan. 14, 2011, entitled "High-Voltage Apparatus Having Cooling Structure and Vehicle Having the Same". The contents of this application are incorporated herein by reference in their entirety.

BACKGROUND OF THE INVENTION

1. Field of the Invention

The present invention relates to a high-voltage apparatus and a vehicle.

2. Discussion of the Background

An automobile that is driven by an engine and a motor (referred to as "a hybrid automobile" hereafter), or an automobile that is driven only by a motor (referred to as "an electric automobile" hereafter) is equipped with high-voltage apparatuses. The high-voltage apparatus includes a battery unit and a high-voltage control device unit. The battery unit includes batteries that store power and supply the power to electrical equipment. The high-voltage control device unit includes high-voltage control devices, which control the power of the batteries to a specified voltage, such as an inverter. Japanese Unexamined Patent Application Publication No. 2006-82803 discloses an example of a related-art structure of such a high-voltage apparatus. The high-voltage apparatus disclosed in Japanese Unexamined Patent Application Publication No. 2006-82803 includes a battery unit and a high-voltage control device unit housed in a substantially rectangular box-shaped housing.

The high-voltage control device unit that includes components such as the inverter, and the battery unit that includes batteries generate heat when they are operated. Charge and discharge efficiency of the batteries decreases under high temperature conditions. Also, the inverter may be damaged when the inverter is operated at a temperature higher than the heat resistant temperature thereof. In order to overcome these problems, the high-voltage apparatus disclosed in Japanese Unexamined Patent Application Publication No. 2006-82803 has a cooling structure that cools the battery unit and the high-voltage control device unit. The cooling structure draws cooling air into the housing through an air-intake duct using a blower fan, causes the cooling air to flow toward the battery unit and the high-voltage control device unit in this order, and then exhausts the air through an exhaust duct to outside of the apparatus.

SUMMARY OF THE INVENTION

According to one aspect of the present invention, a high-voltage apparatus comprises a battery device, a high-voltage control device, a housing, and a cooling structure. The battery device includes a battery. The high-voltage control device includes a high-voltage controller configured to control power of the battery. The housing is provided to house the battery device and the high-voltage control device. The cooling structure is to cool the battery device and the high-voltage control device in the housing. The cooling structure comprises a first cooling channel to cool the battery device, a second cooling channel to cool the high-voltage control device, a connection channel connecting the first cooling channel to the second cooling channel, and a ventilator. The ventilator is to flow air through the first cooling channel, the second cooling channel, and the connection channel. The connection channel has a first opening portion connected to the first cooling channel, a second opening portion connected to the second cooling channel, and an inner flow path to communicate the first opening portion to the second opening portion. A sectional area of the first opening portion and a sectional area of the second opening portion are each set to be smaller than a sectional area of the inner flow path.

According to another aspect of the present invention, a vehicle comprises a seat and the high-voltage apparatus. The seat includes a seating portion and a seat back. The seat back stands on a rear side of the seating portion. The high-voltage apparatus is disposed on a rear surface side of the seat back of the seat.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 6 is an enlarged view of a part that is equivalent to part V in FIG. 3.

DESCRIPTION OF THE EMBODIMENTS

Figure 1:
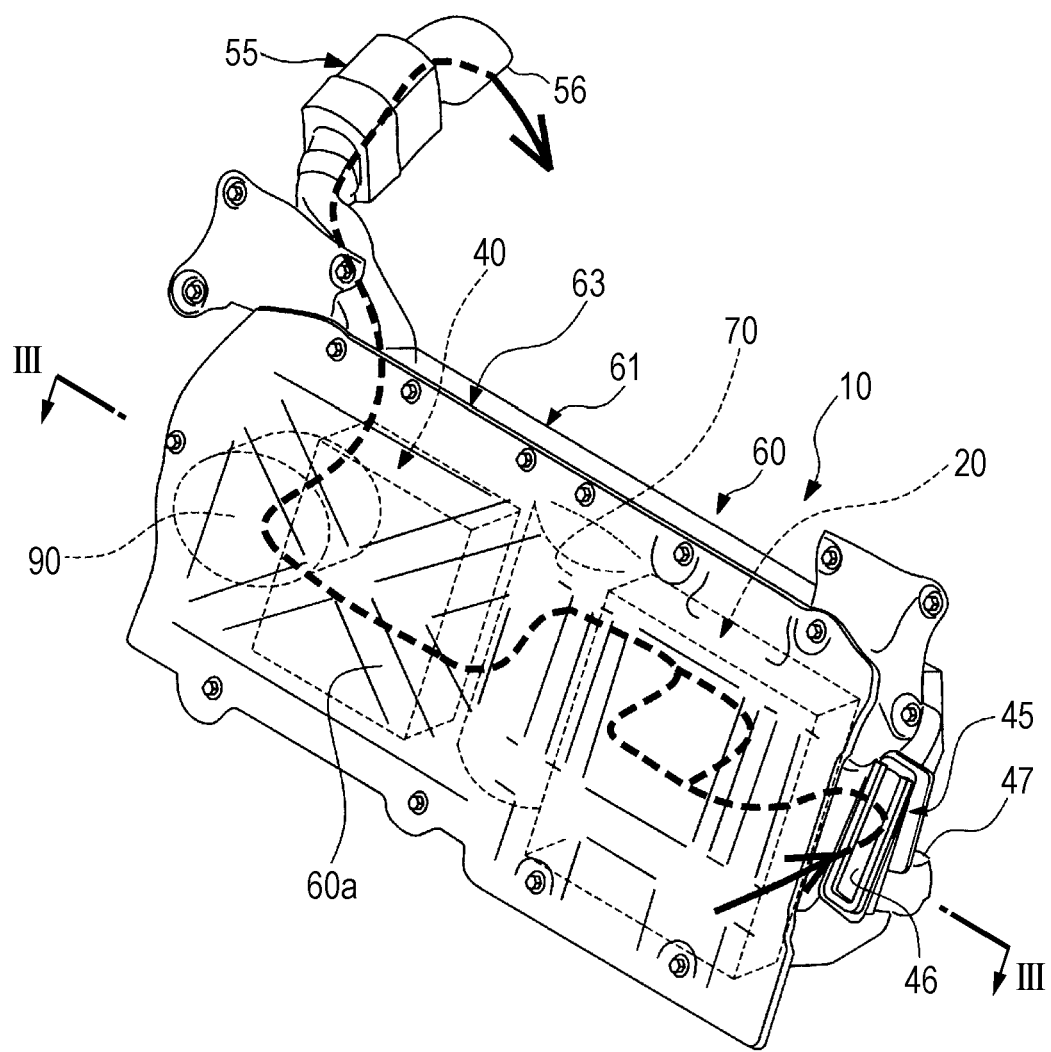
FIG. 1 is a general perspective view of a high-voltage apparatus having a cooling structure according to a first embodiment of the present invention seen from a front surface side.

The embodiments will now be described with reference to the accompanying drawings, wherein like reference numerals designate corresponding or identical elements throughout the various drawings.

First Embodiment

Figure 2:
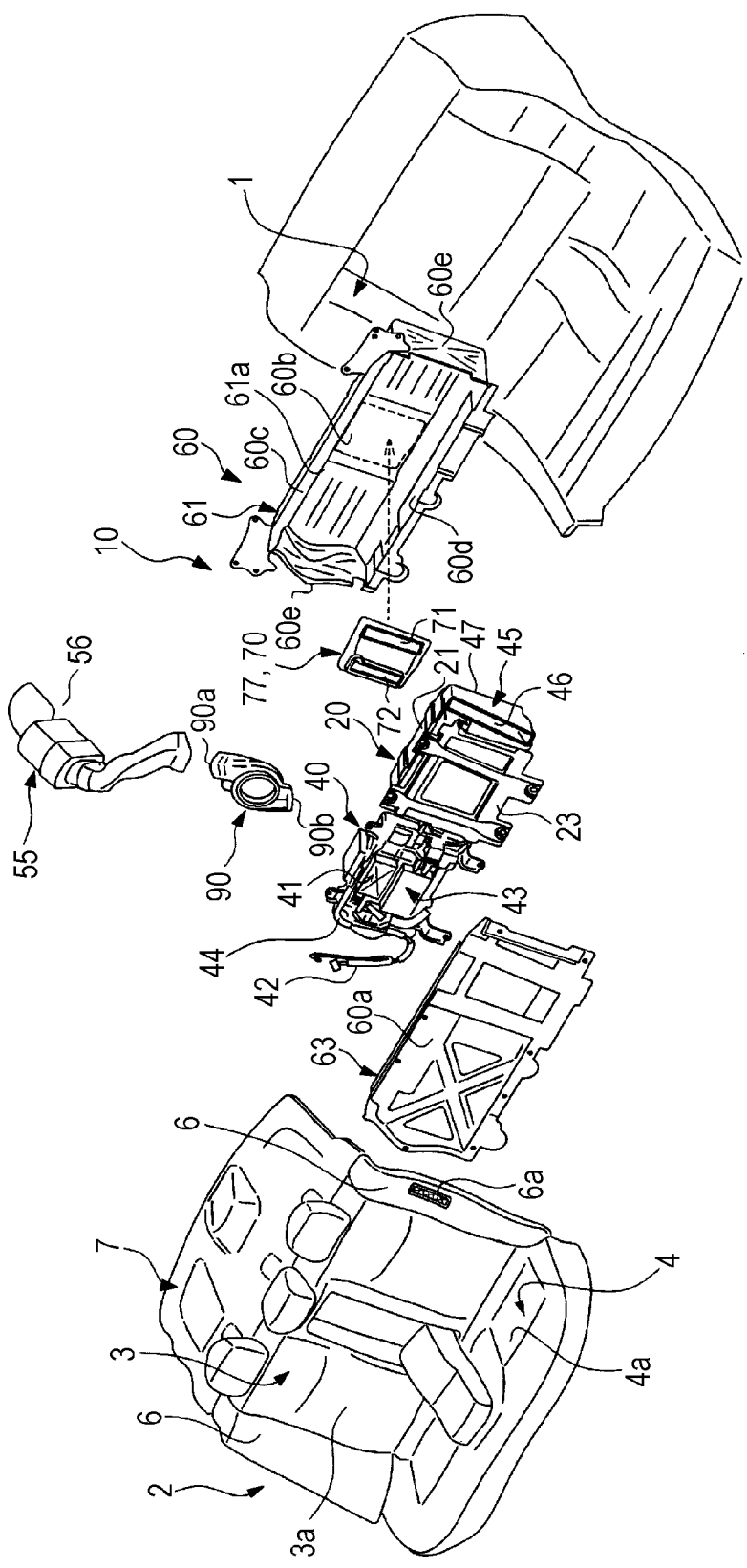
FIG. 2 is an exploded perspective view of a rear seat of a vehicle and the high-voltage apparatus that is installed on the rear surface side of the rear seat.
Figure 3:
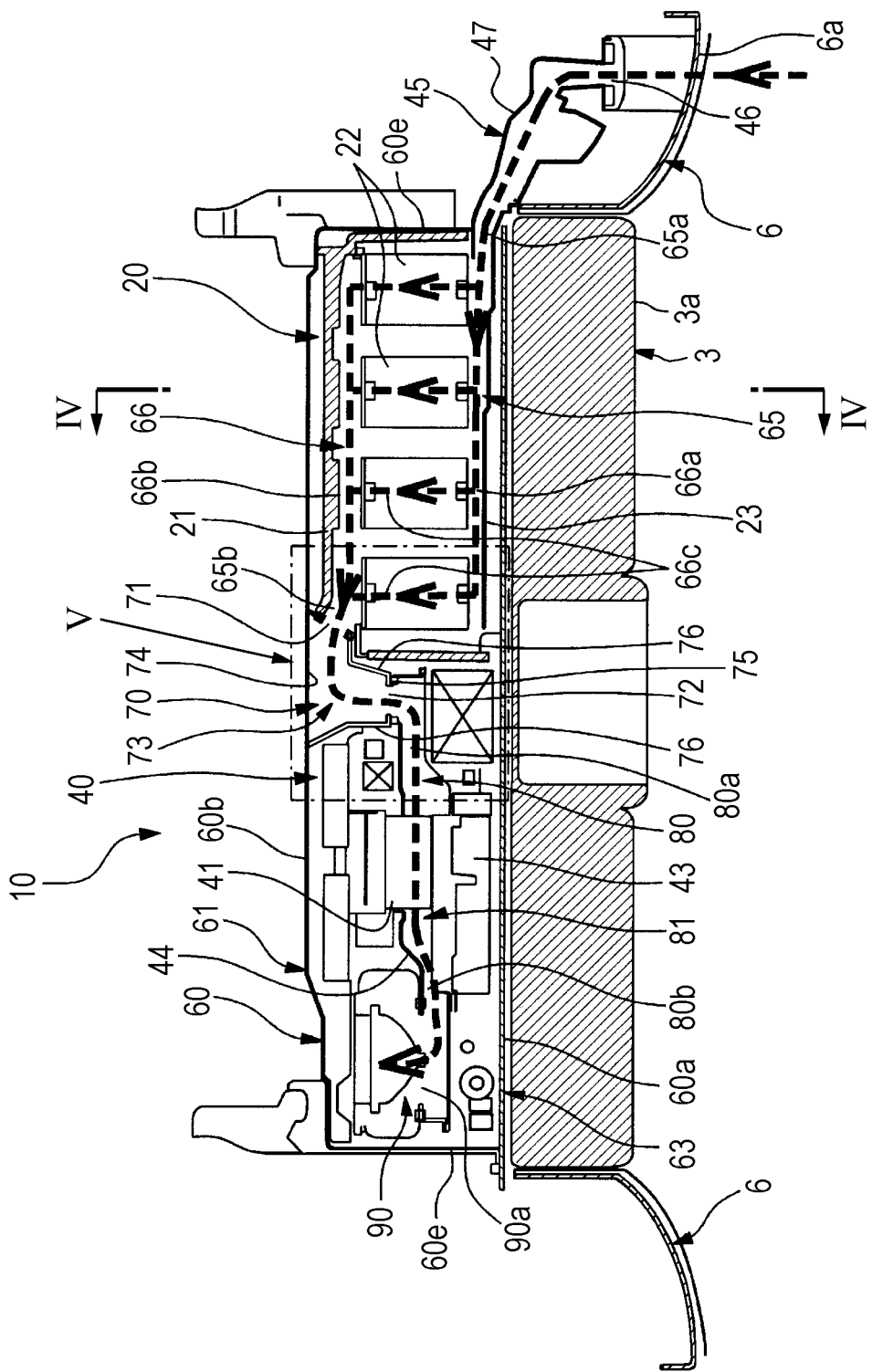
FIG. 3 is a cutaway view illustrating a section of the inner structure of the high-voltage apparatus taken along line III-III in FIG. 1.
Figure 4:
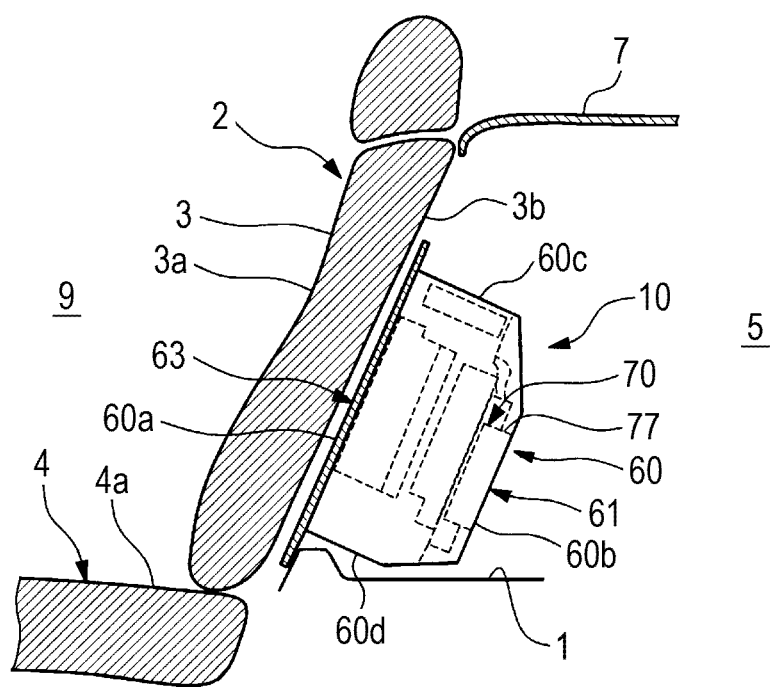
FIG. 4 is an outline view illustrating the arrangement of the high-voltage apparatus taken along line IV-IV in FIG. 3.

FIG. 1 is a general perspective view of a high-voltage apparatus 10 having a cooling structure according to a first embodiment of the present invention seen from a front surface side. FIG. 2 is an exploded perspective view of a rear seat 2 of a vehicle and the high-voltage apparatus 10 that is installed on the rear surface side of the seat 2. FIG. 3 is a cutaway view illustrating a section of the inner structure of the high-voltage apparatus 10 taken along line III-III in FIG. 1. FIG. 4 is an outline view illustrating the arrangement of the high-voltage apparatus 10 taken along line IV-IV in FIG. 3. The high-voltage apparatus 10 illustrated in these drawings is installed in a hybrid automobile driven by an engine and a motor. Although illustration of details of the hybrid automobile is omitted herein, in the hybrid automobile, in order to supply power from a battery, which is a direct-current power source, to the motor, a direct current is converted into an alternating current using an inverter, and in order to store part of kinetic energy or engine output of the vehicle through the motor in the battery, an alternating current is converted into a direct current using the inverter. Since the direct-current converted by the inverter is a high-voltage current, the voltage of part of the current is lowered using a DC to DC converter.

Thus, the high-voltage apparatus 10 includes a battery unit (battery unit) 20 and a high-voltage control device unit 40. The battery unit 20 includes batteries (battery) 22 therein. The high-voltage control device unit 40 includes therein an inverter unit 41 and a DC to DC converter 43, which are high-voltage control devices that control power of the batteries to a specified voltage. In addition, the high-voltage apparatus 10 includes a box-shaped housing 60, which houses the battery unit 20 and the high-voltage control device unit 40, and a cooling structure that cools the battery unit 20 and the high-voltage control device unit 40 housed in the housing 60. In the following description, a front side or a front surface side refers to a side of a lid plate 63 and a side of a front wall 60a of the housing 60, which will be described later, of the high-voltage apparatus 10. A rear side or a rear surface side refers to a side of a rear wall 60b of the housing 60. The left and the right respectively refer to the left and right sides when, as illustrated in FIG. 1, the housing 60 of the high-voltage apparatus 10 is seen from the front surface side (the lid plate 63 side).

The seat 2 illustrated in figures such as FIG. 2 is a rear seat of the vehicle (rear seat). The seat 2 includes a seating portion 4 and a seat back (center seat back) 3. Passengers sit on the seating portion 4. The seat back 3 stands behind the seating portion 4 and form a seat back portion. Side covers (side seat backs) 6 are mounted on either side portion of the seat back 3. The side covers 6 are cover members formed of molded synthetic resin. An opening portion 6a is formed in one of the side covers 6 on the right side. The opening portion 6a is connected to an air-intake port 46 of an air-intake duct 45, which will be described later.

In the seat 2, a seating surface 4a of the seating portion 4 and a seating surface 3a of the seat back 3 face the interior of a vehicle 9, and a rear surface 3b side of the seat back 3 faces a trunk room 5, which is formed under a rear tray 7 between the rear tray 7 and a lower frame 1 of a vehicle body. Thus, the interior of the vehicle 9 and the trunk room 5 are separated by the seat back 3 and the side covers 6. The high-voltage apparatus 10 is disposed in the trunk room 5 on the rear surface 3b side of the seat back 3. The front wall 60a of the housing 60 of the high-voltage apparatus 10 is slightly inclined backward so as to face the rear surface 3b of the seat back 3.

As illustrated in FIG. 2, the housing 60 of the high-voltage apparatus 10 includes a rectangular box-shaped main body portion 61 and the planar plate-shaped lid plate 63. The body portion 61 has an opening portion 61a formed over the entire area of the front side thereof. The lid plate 63 covers the opening portion 61a of the main body portion 61. The lid plate 63 forms the front wall 60a of the housing 60. The main body portion 61 has a container shape with a bottom. Specifically, the main body portion 61 has the rear wall 60b, upper and lower walls 60c and 60d, and a pair of side walls 60e such that the upper, lower, and side walls 60c, 60d, and 60e are disposed around the rear wall 60b.

The battery unit 20 is disposed in the housing 60 on the right side (a right half) of the center of the housing 60 in a width direction (lateral direction). The battery unit 20 includes a box-shaped battery box 21, a plurality of batteries (battery) 22 (see FIG. 3), and a plate-shaped frame 23. A front surface of the battery box 21 is open. The batteries are mounted in the battery box 21. The frame 23 is placed over and mounted on the battery box 21 on the front surface side. The battery box 21 is formed of a material having a high stiffness such as aluminum or magnesium. Part of a first cooling channel 65, through which cooling air flows, is formed in gaps between cell portions of each battery 22 mounted in the battery box 21. The details of the first cooling channel 65 will be described later.

The high-voltage control device unit 40 is disposed in the housing 60 on the left side (left half) of the center of the housing 60 in the width direction (lateral direction). The high-voltage control device unit 40 includes the inverter unit 41 that includes the inverter, the DC to DC converter 43, a plate-shaped tray 44 on which the inverter unit 41 and the DC to DC converter 43 are mounted, wiring 42, and so forth that are assembled therein so as to form a unit. Components of the inverter unit 41 are disposed on front and rear sides of the tray 44. The DC to DC converter 43 is disposed on the front surface side of the tray 44. Part of a second cooling channel 80, through which cooling air flows, is formed along the tray 44 between the inverter unit 41 and the DC to DC converter 43. The detailed structure of the second cooling channel 80 will be described later.

The air-intake duct 45 is provided in order to introduce cooling air into the housing 60. The air-intake duct 45 is formed of a polypropylene form or the like. The air-intake duct 45 is disposed on a right side portion of the battery unit 20. The air-intake duct 45 has the air-intake port 46 and piping 47. The air-intake port 46 is open toward the front surface side, and the piping 47 allows communication between the air-intake port 46 and the battery box 21 of the battery unit 20. The air-intake port 46 is connected to the opening portion 6a on the right side cover 6 so as to introduce air from the interior of the vehicle 9 through the opening 6a.

A blower fan 90 is provided in the housing 60. Specifically, the blower fan 90 is disposed on the rear side of the high-voltage control device unit 40 at a left end portion of the housing 60. An exhaust duct 55 is provided in order to exhaust cooling air in the housing 60 to outside of the housing 60. As is the case with the air-intake duct 45, the exhaust duct 55 is formed of a polypropylene form or the like. The exhaust duct 55 extends from an exhaust end 90b of the blower fan 90 toward an upper left direction on the rear side of the housing 60. An exhaust port 56 is formed at an end (a downstream end) of the exhaust duct 55. The exhaust port 56 is open in the trunk room 5.

The cooling structure provided in the housing 60 of the high-voltage apparatus 10 cools the battery unit 20 and the high-voltage control device unit 40. The cooling structure is a path of cooling air that allows communication between the air-intake duct 45 and the exhaust duct 55 in the housing 60. The cooling structure has the first cooling channel 65, the second cooling channel 80, and an intermediate duct (connection channel) 70. The first cooling channel 65 is provided to cool the battery unit 20, the second cooling channel 80 is provided to cool the high-voltage control device unit 40, and the intermediate duct 70 allows communication between the first cooling channel 65 and the second cooling channel 80. The cooling structure will be described in detail below.

As illustrated in FIG. 3, the first cooling channel 65 is provided in the battery unit 20. The first cooling channel 65 has an introduction end (introduction portion) 65a, a delivery end (delivery portion) 65b, and a communication path 66. Cooling air is introduced into the battery box 21 from the air-intake duct 45 through the introduction end 65a, cooling air in the battery box 21 is delivered to the intermediate duct 70 through the delivery end 65b, and the communication path 66 allows communication between the introduction end 65a and the delivery end 65b in the battery box 21. The air-intake duct 45 is connected to the introduction end 65a, and the delivery end 65b is connected to an inlet port 71 of the intermediate duct 70. The communication path 66 has a first path 66a, a second path 66b, and a plurality of connection paths 66c. The first path 66a extends from the introduction end 65a along the front side (the front wall 60a side) of the battery 22 in the battery box 21. The second path 66b extends to the delivery end 65b along the rear side (the rear wall 60b side) of the batteries 22 in the battery box 21. The connection paths 66c extend in the gaps between the cell portions of the batteries 22 in a front-rear direction (longitudinal direction) and connect the first path 66a to the second path 66b.

The second cooling channel 80 is provided in the high-voltage control device unit 40. The second cooling channel 80 has an introduction end 80a, a delivery end 80b, and a communication path 81. Cooling air is introduced into the high-voltage control device unit 40 from the intermediate duct 70 disposed at the right end of the high-voltage control device unit 40 through the introduction end 80a. Cooling air is delivered to the blower fan 90 through the delivery end 80b disposed at the left end of the high-voltage control device unit 40. The communication path 81 allows communication between the introduction end 80a and the delivery end 80b in the high-voltage control device unit 40. The introduction end 80a is connected to an outlet port 72 of the intermediate duct 70. The delivery end 80b is connected to an air-intake end 90a of the blower fan 90. The communication path 81 passes through the high-voltage control device unit 40 in the width direction (the lateral direction) from the introduction end 80a toward the delivery end 80b. The communication path 81 is formed along the front surface of the tray 44 between the inverter unit 41 and the DC to DC converter 43. In the communication path 81, plate-shaped cooling fins (not shown) are arranged such that surfaces of the cooling fins are directed in a direction in which cooling air flows.

As illustrated in FIG. 3, the battery unit 20 and the high-voltage control device unit 40 are arranged on either side in the width direction in the housing 60. The first cooling channel 65 and the second cooling channel 80 respectively extend in the width direction on the sides of the housing 60 in the width direction. The intermediate duct 70 is formed at a central portion of the housing 60 in the width direction. The intermediate duct 70 is formed inside an inner surface of the rear wall (the first partition wall) 60b in the housing 60 at the central portion of the housing 60 in the width direction.

Figure 5:
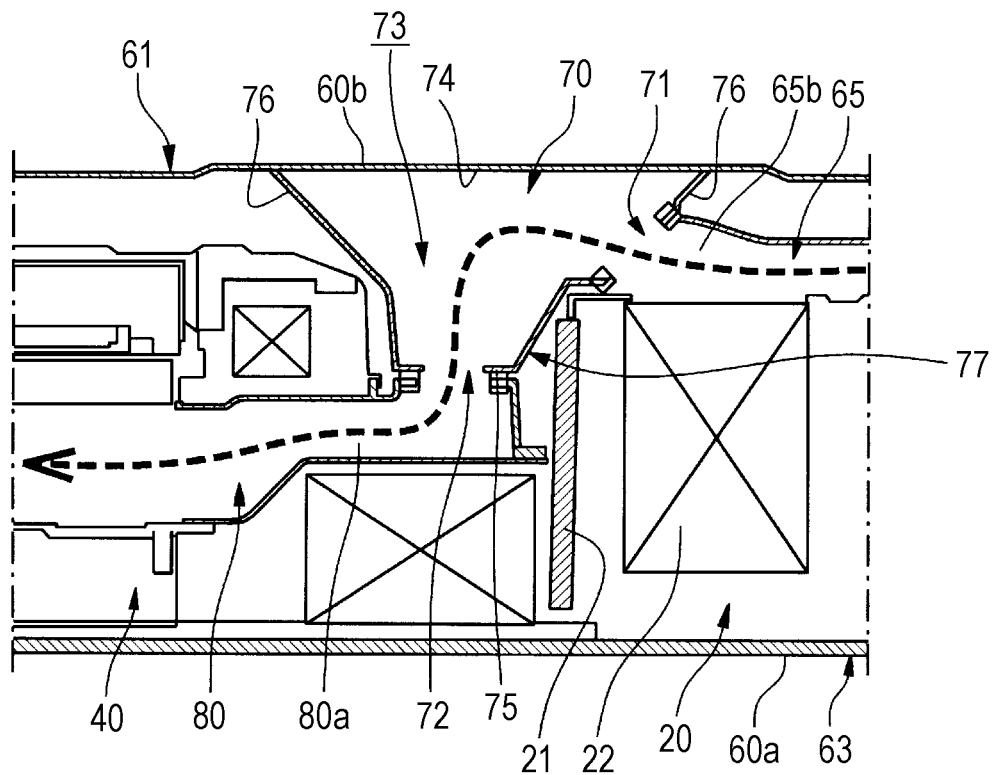
FIG. 5 is an enlarged view of part V in FIG. 3 and illustrates the detailed structure of an intermediate duct.

FIG. 5 is an enlarged view of part V in FIG. 3 and illustrates the detailed structure of the intermediate duct 70. As illustrated in FIG. 5, the intermediate duct 70 has the inlet port (first opening portion) 71, the outlet port (second opening portion) 72, and an inner flow path 73. The inlet port 71 is connected to the delivery end 65b of the first cooling channel 65, the outlet port 72 is connected to the introduction end 80a of the second cooling channel 80, and the inner flow path 73 allows communication between the inlet port 71 and the outlet port 72. The intermediate duct 70 is formed by a pair of bottom walls 74 and 75, and side walls 76. The pair of spaced-apart bottom walls 74 and 75 are respectively disposed on the rear and the front of the inner flow path 73 so as to oppose each other. The side walls 76 connect the corresponding ends of the bottom wall 74 and the bottom wall 75 to each other. The intermediate duct 70 has a trapezoidal sectional shape. The sectional area of the bottom wall 74 is larger than that of the bottom wall 75. The bottom wall 74 is part of the inner surface of the rear wall 60b of the housing 60. The inlet port 71 is formed in one of the side walls 76 that faces the right side (the battery unit 20 side), and the outlet port 72 is formed in the bottom wall 75.

As illustrated in FIG. 5, the sectional area of the inlet port 71 and the sectional area of the outlet port 72 are each set to be smaller than the sectional area of the inner flow path 73 in the intermediate duct 70. By doing this, the intermediate duct 70 can have a function of an expansion silencer that can suppress air flow noise. In this case, in order to obtain a sufficient effect of noise suppression, it is necessary that the sectional areas of the inlet port 71 and the outlet port 72 and dimensions such as the distance between the inlet port 71 and the outlet port 72 be adequately designed.

The intermediate duct 70 has a substantially plate-shaped structure member 77, which is integrally formed of the bottom wall 75 and the side walls 76. As illustrated in FIG. 2, in the intermediate duct 70, the structure member 77 is secured to the inner surface of the rear wall 60b of the housing 60. The inner flow path 73 is defined between the inner surface of the rear wall 60b and the structure member 77.

In FIGS. 1, 3 and 5, flows of cooling air in the housing 60 of the high-voltage apparatus 10 are indicated by dotted arrows. In the high-voltage apparatus 10 according to the present embodiment, as illustrated in FIG. 3, a path of cooling air that allows communication between the air-intake duct 45 and the exhaust duct 55 in the housing 60 is connected in the following order: The air-intake duct 45, the first cooling channel 65, the intermediate duct 70, the second cooling channel 80, the blower fan 90, and the exhaust duct 55. Thus, when the blower fan 90 is operated, cooling air is introduced into the air-intake duct 45 through the air-intake port 46. The cooling air introduced into the air-intake duct 45 is introduced into the first cooling channel 65 in the battery box 21 from the air-intake duct 45. The cooling air in the first cooling channel 65 flows from the first path 66a through the connection paths 66c to the second path 66b. The cooling air passing through the first cooling channel 65 performs heat exchange with the batteries 22, thereby cooling heat generated by the batteries 22.

The cooling air having exited the first cooling channel 65 in the battery unit 20 is introduced into the intermediate duct 70. The cooling air having been introduced into the intermediate duct 70 flows from the inlet port 71 through the inner flow path 73, is guided to the outlet port 72, and is exhausted to outside of the intermediate duct 70. Since the sectional area of the inlet port 71 and the sectional area of the outlet port 72 are each set to be smaller than the sectional area of the inner flow path 73, the intermediate duct 70 functions as the expansion silencer. Thus, air flow noise due to cooling air flowing in the intermediate duct 70 can be suppressed.

The cooling air having exited the intermediate duct 70 is introduced into the second cooling channel 80 in the high-voltage control device unit 40. The cooling air passing through the second cooling channel 80 performs heat exchange with the inverter unit 41 and the DC to DC converter 43, thereby cooling heat generated by the high-voltage control device unit 40 that includes the inverter unit 41 and the DC to DC converter 43. The cooling air having exited the second cooling channel 80 is drawn by the blower fan 90. The cooling air having been exhausted from the blower fan 90 passes through the exhaust duct 55 and is exhausted to the trunk room 5 through the exhaust port 56.

As described above, the high-voltage apparatus 10 according to the present embodiment includes the first cooling channel 65, the second cooling channel 80, and the intermediate duct 70 as the cooling structure that cools the battery unit 20 and the high-voltage control device unit 40 mounted in the housing 60. The first cooling channel 65 is provided in the battery unit 20, the second cooling channel 80 is provided in the high-voltage control device unit 40, and the intermediate duct 70 allows communication between the first cooling channel 65 and the second cooling channel 80. The high-voltage apparatus 10 also includes the blower fan 90 that causes cooling air to flow through the first cooling channel 65, the second cooling channel 80, and the intermediate duct 70.

The intermediate duct 70 has the inlet port 71, the outlet port 72, and the inner flow path 73. The inlet port 71 is connected to the first cooling channel 65, the outlet port 72 is connected to the second cooling channel 80, and the inner flow path 73 allows communication between the inlet port 71 and the outlet port 72. The sectional area of the inlet port 71 and the sectional area of the outlet port 72 are each set to be smaller than the sectional area of the inner flow path 73. By doing this, the intermediate duct 70 functions as the expansion silencer. Thus, air flow noise due to cooling air flowing in the intermediate duct 70 can be suppressed, and accordingly, noise due to blowing of cooling air can be reduced.

In addition, a sound insulating structure (not shown) may be provided. The sound insulating structure uses a sound insulating member (such as a sound insulating sheet) that is provided between the housing 60 of the high-voltage apparatus 10 and the rear surface 3b of the seat back 3. In this case, since the intermediate duct 70 suppresses noise due to the above-described expansion silencer function, it is sufficient for the sound insulating member to cover part of the rear surface 3b side of the seat back 3 (for example, a portion corresponding to the intermediate duct 70 and the area around it) in order to effectively suppress a situation in which an undesirable sound deriving from operational noise generated by the high-voltage control device unit 40 is sensed by the occupants in the seat 2. Thus, the noise level can be decreased to a level that can be negligible. It is not necessary that the sound insulating member be disposed over the entirety of the seat back 3 on the rear surface 3b side. Thus, the amount of the sound insulating member to be used can be decreased, and accordingly, the cost can be decreased.

In the intermediate duct 70 that has a trapezoidal sectional shape, the bottom wall 74 is part of the inner surface of the housing 60. Because of this structure, the intermediate duct 70 and its structure member 77 can suppress resonance of the housing 60 due to vibration caused when high-voltage control devices including the inverter unit 41 and the DC to DC converter 43, the battery unit 20, and the like are operated. In particular, the bottom wall 74, which is a bottom wall having a larger area out of the pair of bottom walls 74 and 75 of the intermediate duct 70 that has a trapezoidal sectional shape, is disposed on the rear wall 60b side. By doing this, a larger area can be allocated for the intermediate duct 70 to contact the rear wall 60b of the housing 60. Thus, resonance of the housing 60 can be effectively suppressed.

In the present embodiment, the intermediate duct 70 has the plate-shaped structure member 77 as a component, which is integrally formed of the bottom wall 75 and the side walls 76. In the intermediate duct 70, the structure member 77 is secured to the inner surface of the rear wall 60b of the housing 60. The inner flow path 73 is defined between the inner surface of the rear wall 60b and the structure member 77. With this structure, the structure member 77 of the intermediate duct 70 can be used as a reinforcing member that reinforces the rear wall 60b of the housing 60. By doing this, a situation in which a reinforcing member that reinforces the housing limits the arrangement of the path of cooling air as occurs with the related-art structure can be avoided. Thus, by providing the intermediate duct 70 at a central portion between the first cooling channel 65 and the second cooling channel 80 in the housing 60, a smooth flow of cooling air that straightly extends through the housing 60 in the width direction can be ensured while the housing 60 can have a necessary strength.

In the present embodiment, the communication path 66 of the first cooling channel 65 has the first path 66a, the second path 66b, and the connection paths 66c. The first path 66a extends from the introduction end 65a along the front side of the battery 22 in the battery box 21. The second path 66b extends along the rear side of the batteries 22 and is connected to the delivery end 65b in the battery box 21. The connection paths 66c extend across the plurality of batteries 22 from the front side to the rear side and connect the first path 66a to the second path 66b in the battery box 21.

With this structure, the communication path 66 has the first path 66a and the second path 66b, which are respectively disposed on the front side and the rear side of the batteries 22 in the battery unit 20. By doing this, due to cooling air flowing in the first path 66a and the second path 66b, heat insulation between the batteries 22 and the front wall 60a of the housing 60, and between the batteries 22 and the rear wall 60b of the housing 60 can be achieved. Thus, exhaustion of heat generated by the batteries 22 to outside of the housing 60 can be suppressed. In particular, in the present embodiment, the rear wall 60b and the front wall 60a of the housing 60 are a pair of the partition walls on sides of the housing 60 having larger areas. Accordingly, exhaustion of heat generated by the batteries 22 to outside of the housing 60 can be more effectively suppressed.

In the present embodiment, the high-voltage apparatus 10 is disposed on the rear surface 3b side of the seat back 3 in the rear seat 2 of the vehicle. The rear wall 60b, on which the intermediate duct 70 is disposed, of the housing 60 of the high-voltage apparatus 10 faces the rear side of the vehicle, which is opposite to the seat back 3 side. By doing this, the intermediate duct 70 and its structure member 77 reinforce the rear wall 60b of the housing 60 that faces the rear side of the vehicle. Thus, a necessary strength of the housing 60 against rear crash of the vehicle can be ensured.

Second Embodiment

Figure 6:
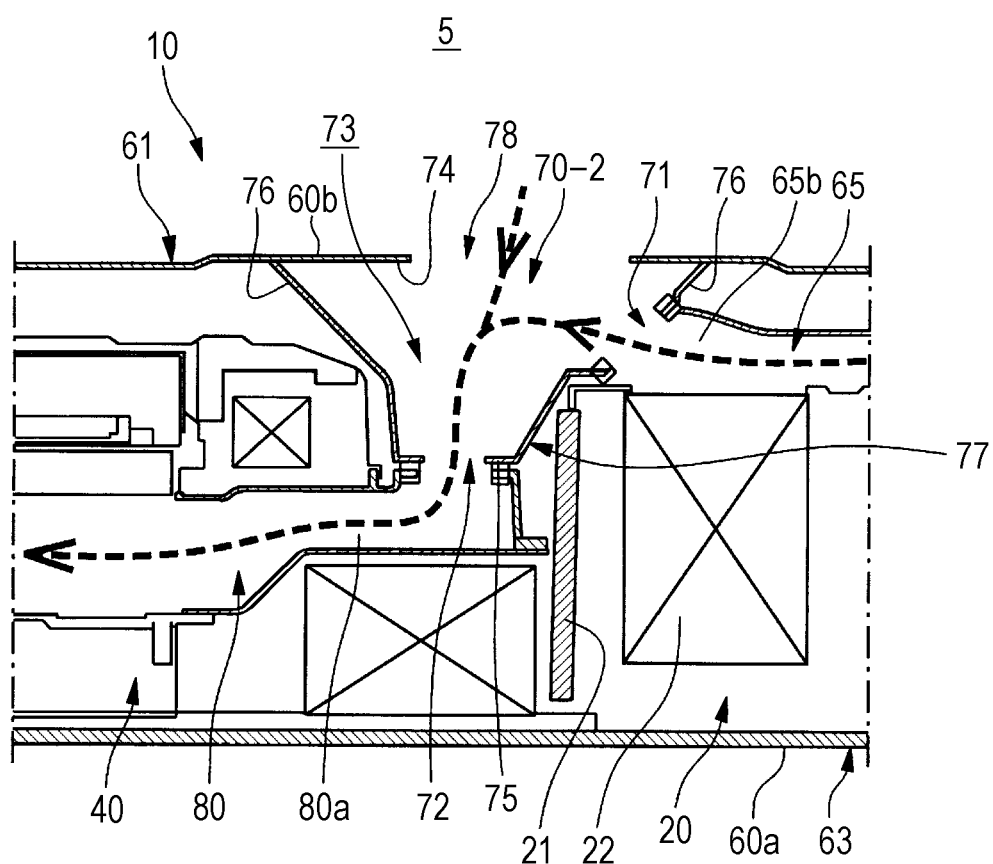
FIG. 6 illustrates the detailed structure of an intermediate duct provided in a high-voltage apparatus having a cooling structure according to a second embodiment of the present invention.

A second embodiment according to the present invention will be described below. In the description and the corresponding drawing of the second embodiment, components that are similar to or equal to those in the first embodiment are denoted by the same reference numerals, and the detailed description thereof is omitted. Matters except for those described below are similar to those of the first embodiment. FIG. 6 illustrates the detailed structure of an intermediate duct 70-2 formed in the high-voltage apparatus 10 having a cooling structure according to the second embodiment of the present invention. FIG. 6 is an enlarged view of a part that is equivalent to part V in FIG. 3 in the first embodiment.

The intermediate duct 70-2 provided in the high-voltage apparatus 10 according to the present embodiment has, in addition to the inlet port 71 formed in the side wall 76 on the battery unit 20 side, another inlet port 78 formed in the bottom wall 74. The inlet port 78 is formed in the rear wall 60b of the housing 60, part of which is the bottom wall 74, and is open toward inside of the trunk room 5. By doing this, cooling air flowing from the first cooling channel 65 and cooling air from the trunk room 5 are introduced into the intermediate duct 70-2 through the inlet port 71 and the inlet port 78, respectively.

In the high-voltage apparatus 10, the battery unit 20 and the high-voltage control device unit 40 have different optimum operating temperature ranges. The optimum operating temperature range of the high-voltage control device unit 40 is higher than that of the battery unit 20. In addition, the temperature of the high-voltage control device unit 40 tends to rise due to heat generated by components thereof such as switching elements and capacitors. When the temperature of the high-voltage control device unit 40 has risen above the optimum operating temperature range, and the high-voltage control device unit 40 is cooled using the cooling structure according to the first embodiment, cooling air is also supplied to the battery unit 20 at the same time, thereby cooling the battery unit 20. For this reason, when the battery unit 20 is operated in the optimum temperature range, the temperature of the battery unit 20 is decreased. This may result in a situation in which the battery unit 20 operates at a temperature below the optimum temperature.

The cooling structure according to the present embodiment has the additional inlet port 78 in order to cause cooling air to flow into the intermediate duct 70-2 without passing through the first cooling channel 65. Thus, by operating the blower fan 90, in addition to cooling air having passed through the first cooling channel 65, which is used to cool the battery unit 20, cooling air directly introduced from the trunk room 5 can be used to cool the high-voltage control device unit 40.

As described above, the cooling structure according to the present embodiment has the inlet port 78 in the intermediate duct 70-2. Thus, when the temperature of the high-voltage control device unit 40 rises, the high-voltage control device unit 40 can be effectively cooled while a situation in which the operating temperature of the battery unit 20 falls below an intended range is avoided. In addition, since the inlet port 78 is formed, cooling air can be introduced into the intermediate duct 70-2 through a path other than the first cooling channel 65 that is used to cool the battery unit 20, a pressure loss that occurs when cooling air passes through the first cooling channel 65 can be reduced. Thus, an increase in the size of the blower fan 90 can be avoided. Accordingly, a space in which the blower fan 90 is installed, the weight of the blower fan 90, and power used by the blower fan 90 can be decreased.

Although the embodiments of the present invention have been described, the present invention is not limited to the above-described embodiments. A variety of modifications are possible without departing from the technical concepts according to aspects of the present invention or the technical concepts described in the description and illustrated in the drawings. For example, in the above-described embodiments, the bottom wall 74 of the intermediate duct 70 or 70-2 is part of the rear wall 60b of the housing 60. Alternatively, the bottom wall 74 of the intermediate duct 70 or 70-2 may be provided as a component separate from the rear wall 60b of the housing 60, and the separate bottom wall 74 may be secured to the inner surface of the rear wall 60b. In the above-described embodiments, the inlet port 71 that communicates with the first cooling channel 65 is formed in the side wall 76, and the outlet port 72 that communicates with the second cooling channel 80 is formed in the bottom wall 75 in the intermediate duct 70 or 70-2 having a trapezoidal sectional shape. Alternatively, although it is not illustrated in figures, other structures may be used. These structures include, for example, a structure in which an inlet port that communicates with the first cooling channel 65 is formed in the bottom wall 75, and an outlet port that communicates with the second cooling channel 80 is formed in the side wall 76.

In the above-described embodiments, the automobile is a hybrid automobile. However, the high-voltage apparatus 10 having a cooling structure according to the present invention may be applicable to an electric automobile driven only by a motor.

In order to solve the above-described problems, a high-voltage apparatus (10) having a cooling structure according to an embodiment of the present invention includes a battery unit (20) that includes a battery (22) therein, a high-voltage control device unit (40) that includes a high-voltage control device (41 or 43) therein that controls power of the battery (22), a housing (60) that houses the battery unit (20) and the high-voltage control device unit (40), and a cooling structure that cools the battery unit (20) and the high-voltage control device unit (40) in the housing (60). In the high-voltage apparatus (10), the cooling structure includes a first cooling channel (65) that is provided to cool the battery unit (20), a second cooling channel (80) that is provided to cool the high-voltage control device unit (40), a connection channel (70) that connects the first cooling channel (65) to the second cooling channel (80), and a unit that blows air (90) into the first cooling channel (65), the second cooling channel (80), and the connection channel (70). In the high-voltage apparatus (10), the connection channel (70) has a first opening portion (71) that is connected to the first cooling channel (65), a second opening portion (72) that is connected to the second cooling channel (80), and an inner flow path (73) that allows communication between the first opening portion (71) and the second opening portion (72). In the high-voltage apparatus (10), a sectional area of the first opening portion (71) and a sectional area of the second opening portion (72) are each set to be smaller than a sectional area of the inner flow path (73).

In the high-voltage apparatus having a cooling structure according to the embodiment of the present invention, the sectional area of the first opening portion and the sectional area of the second opening portion are each set to be smaller than the sectional area of the inner flow path in the connection channel. Thus, the connection channel can have a function of an expansion silencer. This can suppress air flow noise generated due to cooling air flowing in the connection channel. Accordingly, noise due to blowing of cooling air in the housing can be reduced.

Preferably, in the high-voltage apparatus having a cooling structure according to the embodiment of the present invention, the connection channel (70) is formed of a pair of opposing bottom walls (74 and 75) that are spaced apart from each other and disposed on one side and the other side of the inner flow path (73), and side walls (76) that connect corresponding ends of the pair of bottom walls (74 and 75) to each other. In this case, the connection channel (70) has a trapezoidal sectional shape, and an area of one of the bottom walls (74) of the connection channel (70) is greater than an area of the other bottom wall (75) of the connection channel (70). In this case, the one bottom wall (74) is secured to an inner surface of a partition wall (60b) of the housing (60), or the one bottom wall (74) is part of the inner surface of the partition wall (60b) of the housing (60).

With this structure, since the one bottom wall of the connection channel is secured to or part of the inner surface of the housing, resonance of the housing due to vibration caused when the high-voltage control device unit and the battery unit are operated can be suppressed using components of the connection channel. In particular, the bottom wall having a larger area out of the pair of bottom walls of the connection channel that has a trapezoidal sectional shape is disposed on the inner surface side of the housing. By doing this, a larger area can be allocated for the connection channel to contact the inner surface of the housing. Thus, resonance of the housing can be effectively suppressed.

Preferably, in the high-voltage apparatus having a cooling structure according to the embodiment of the present invention, the other bottom wall (75) of the connection channel (70) has one of the first opening portion (71) and the second opening portion (72), and one of the side walls (76) of the connection channel (70) has the other one of the first opening portion (71) and the second opening portion (72). Thus, with a simple structure, the connection channel can have a structure in which the sectional area of the first opening portion and the sectional area of the second opening portion can be each set to be smaller than the sectional area of the inner flow path. This allows the connection channel to have a shape that is necessary for the connection channel to function as the expansion silencer.

Preferably, the battery unit (20) and the high-voltage control device unit (40) are arranged on one side and the other side in a width direction in the housing (60), and the first cooling channel (65) and the second cooling channel (80) respectively extend in the width direction on one side and the other side in the width direction in the housing (60). In this case, the connection channel (70) is disposed in a central portion in the width direction in the housing (60) and has a structure member (77) that is integrally formed of the side walls (76) and the other bottom wall (75). In this case, the structure member (77) is secured to the inner surface of the partition wall (60b) of the housing (60), and the inner surface of the partition wall (60b) and the structure member (77) form the inner flow path (73) therebetween.

With this structure, the structure member of the connection channel can be used as the reinforcing member that reinforces the partition wall of the housing. This allows the connection channel to reinforce the partition wall of the housing. By doing this, a situation in which a reinforcing member that reinforces the housing limits the arrangement of the path of cooling air as occurs with the related-art structure can be avoided. Accordingly, as described above, the battery unit and the high-voltage control device unit can be arranged on the one side and the other side in the width direction in the housing, the first cooling channel and the second cooling channel can respectively extend in the width direction on the one side and the other side in the width direction in the housing, and the connection channel can be formed at a central portion in the width direction in the housing. Thus, a smooth flow of cooling air that substantially straightly extends in the width direction, in which the battery unit and the high-voltage control device are arranged in the housing, can be ensured while the housing can have a necessary strength.

Preferably, in the high-voltage apparatus having a cooling structure according to the embodiment of the present invention, the housing (60) includes the first partition wall (60b) with which or on which the connection channel (70) is formed, and a second partition wall (60a) that opposes and is spaced apart from the first partition wall (60b). In this case, the battery unit (20) is disposed between the first partition wall (60b) and the second partition wall (60a). In this case, the first cooling channel (65) has an introduction portion (65a), through which cooling air is introduced, formed on one of end sides of the second partition wall (60a), a delivery portion (65b) through which the cooling air is delivered to the connection channel (70), and a communication path (66) that allows communication between the introduction portion (65a) and the delivery portion (65b). The communication path (66) has a first path (66a) that extends from the introduction portion (65a) through a space between the battery (22) and the first partition wall (60b), a second path (66b) that extends through a space between the battery (22) and the second partition wall (60a), and is connected to the delivery portion (65b), and a connection path (66c) that extends across the battery (22) from the first partition wall (60b) side to second partition wall (60a) side of the battery (22) so as to connect the first path (66a) to the second path (66b).

With this structure, the communication path has the first path and the second path, which are respectively disposed on the first partition wall side and the second partition wall side of the battery in the battery unit. Due to cooling air flowing in the first path and the second path, heat insulation between the battery unit and the first partition wall, and between the battery unit and the second partition wall can be achieved. This allows cooling air flowing through the first path and the second path to function as a heat insulation material. Thus, exhaustion of heat generated by the battery to outside of the housing can be suppressed. In particular, when the above-described first partition wall and the second partition wall are the partition walls on sides of the housing having larger areas, exhaustion of heat generated by the battery to outside of the housing can be more effectively suppressed.

A vehicle according to the embodiment of the present invention includes a seat (2) that has a seating portion (4) and a seat back (3) that stands on a rear side of the seating portion (4), and the above-described high-voltage apparatus (10) having a cooling structure. In the vehicle, the high-voltage apparatus (10) is disposed on a rear surface (3b) side of the seat back (3) of the seat (2). Preferably, in this case, the housing (60) of the high-voltage apparatus (10) installed in the vehicle has the first partition wall (60b) with which or on which the connection channel (70) is formed, and the second partition wall (60a) that opposes and is spaced apart from the first partition wall (60b). In this case, the battery unit (20) is disposed between the first partition wall (60b) and the second partition wall (60a). In this case, the first cooling channel (65) has the introduction portion (65a), through which cooling air is introduced, formed on the one end side of the second partition wall (60a), the delivery portion (65b) through which the cooling air is delivered to the connection channel (70), and the communication path (66) that allows communication between the introduction portion (65a) and the delivery portion (65b). The communication path (66) has the first path (66a) that extends from the introduction portion (65a) through a space between the battery (22) and the first partition wall (60b), the second path (66b) that extends through a space between the battery (22) and the second partition wall (60a), and is connected to the delivery portion (65b), and the connection path (66c) that extends across the battery (22) from the first partition wall (60b) side to second partition wall (60a) side of the battery (22) so as to connect the first path (66a) to the second path (66b). In this case, the first partition wall (60b), on which or with which the connection channel (70) is formed in the housing (60), faces a rear side of the vehicle, which is a side opposite to the seat back (3).

In the vehicle having the above-described structure, the first partition wall, with which or on which the connection channel is formed in the housing of the high-voltage apparatus, faces the rear side of the vehicle. By doing this, the connection channel and the structure member thereof reinforce the partition wall of the housing that faces the rear side of the vehicle. Thus, a necessary strength of the housing against rear crash of the vehicle can be ensured.

Reference numerals inside parentheses in the above description, which are reference numerals that denote components in the embodiments described above, are indicated to exemplify embodiments of the present invention.

With the cooling structure of the high-voltage apparatus according to the embodiment of the present invention, noise generated by a flow of cooling air in the housing of the high-voltage apparatus can be effectively reduced, the battery unit and the high-voltage control device unit disposed in the housing can be efficiently cooled, and a strength necessary for the housing can be ensured.

Obviously, numerous modifications and variations of the present invention are possible in light of the above teachings. It is therefore to be understood that within the scope of the appended claims, the invention may be practiced otherwise than as specifically described herein.

What is claimed is:

1. A high-voltage apparatus comprising:
    a battery device including a battery;
    a high-voltage control device including a high-voltage controller configured to control power of the battery;
    a housing provided to house the battery device and the high-voltage control device; and
    a cooling structure to cool the battery device and the high-voltage control device in the housing, the cooling structure comprising:
        a first cooling channel to cool the battery device;
        a second cooling channel to cool the high-voltage control device;
        a connection channel connecting the first cooling channel to the second cooling channel; and
        a ventilator to flow air through the first cooling channel, the second cooling channel, and the connection channel,
    wherein the connection channel has a first opening portion connected to the first cooling channel, a second opening portion connected to the second cooling channel, and an inner flow path to communicate the first opening portion to the second opening portion,
    wherein a sectional area of the first opening portion and a sectional area of the second opening portion are each set to be smaller than a sectional area of the inner flow path,
    wherein the connection channel includes a first bottom wall, a second bottom wall, a first side wall, and a second side wall, the first and second bottom walls being spaced apart from each other and being respectively disposed on one side and another side of the inner flow path, the first side wall connecting corresponding ends of the first and second bottom walls to each other,
    wherein the connection channel has a trapezoidal sectional shape, an area of the first bottom wall of the connection channel being greater than an area of the second bottom wall of the connection channel, and
    wherein the first bottom wall is secured to an inner surface of a partition wall of the housing, or the first bottom wall is part of the inner surface of the partition wall of the housing.

2. The high-voltage apparatus according to claim 1,
    wherein the second bottom wall has one of the first opening portion and the second opening portion, and
    wherein one of the side walls has another of the first opening portion and the second opening portion.

3. The high-voltage apparatus according to claim 1,
    wherein the battery device and the high-voltage control device are arranged on one side and another side in a width direction in the housing,
    wherein the first cooling channel and the second cooling channel respectively extend in the width direction on one side and another side in the width direction in the housing, and
    wherein the connection channel is disposed in a central portion in the width direction in the housing, the connection channel having a structure member integrally provided with the side walls and the second bottom wall, the structure member being secured to the inner surface of the partition wall of the housing, the inner flow path being provided between the inner surface of the partition wall and the structure member.

4. The high-voltage apparatus according to claim 1,
    wherein the housing includes a first partition wall with which or on which the connection channel is provided, and a second partition wall that opposes the first partition wall and is spaced apart from the first partition wall,
    wherein the battery device is disposed between the first partition wall and the second partition wall,
    wherein the first cooling channel has an introduction portion through which cooling air is introduced, the introduction portion being provided on one of end sides of the second partition wall, a delivery portion through which the cooling air is delivered to the connection channel, and a communication path to communicate the introduction portion to the delivery portion, and
    wherein the communication path has a first path, a second path, and a connection path, the first path extending from the introduction portion through a space provided between the battery and the first partition wall, the second path extending through a space provided between the battery and the second partition wall, the second path being connected to the delivery portion, the connection path extending across the battery from a first partition wall side to a second partition wall side of the battery to connect the first path to the second path.

5. The high-voltage apparatus according to claim 3,
    wherein the housing includes a first partition wall with which or on which the connection channel is provided, and a second partition wall that opposes the first partition wall and is spaced apart from the first partition wall,
    wherein the battery device is disposed between the first partition wall and the second partition wall,
    wherein the first cooling channel has an introduction portion through which cooling air is introduced, the introduction portion being provided on one of end sides of the second partition wall, a delivery portion through which the cooling air is delivered to the connection channel, and a communication path to communicate between the introduction portion and the delivery portion, and
    wherein the communication path has a first path, a second path, and a connection path, the first path extending from the introduction portion through a space provided between the battery and the first partition wall, the second path extending through a space provided between the battery and the second partition wall, the second path being connected to the delivery portion, the connection path extending across the battery from a first partition wall side to a second partition wall side of the battery to connect the first path to the second path.

6. A vehicle comprising:
    a seat including a seating portion and a seat back, the seat back standing on a rear side of the seating portion; and
    the high-voltage apparatus according to claim 1,
    wherein the high-voltage apparatus is disposed on a rear surface side of the seat back of the seat.

7. The vehicle according to claim 5,
    wherein the high-voltage apparatus is the high-voltage apparatus according to claim 4, and
    wherein the first partition wall faces a rear side of the vehicle, the rear side of the vehicle being a side opposite to the seat back, the first partition wall being a wall on which or with which the connection channel is provided in the housing.

8. The high-voltage apparatus according to claim 1, wherein the ventilator is disposed in the second cooling channel to exhaust air from the second cooling channel to outside of the high-voltage apparatus.

9. The high-voltage apparatus according to claim 1, wherein the housing includes an air-intake hole to introduce air into the first cooling channel from outside of the high-voltage apparatus.

\* \* \* \* \*